United States Patent [19]

Düllings et al.

[11] Patent Number: 4,908,216

[45] Date of Patent: Mar. 13, 1990

[54] APPARATUS FOR THE PRODUCTION OF LOW TENSION MOULDED PARTS

[75] Inventors: Josef Düllings, Issum; Werner Klöker; Dieter Freitag, both of Krefeld; Holger Lusgen, Solingen; Helmut Schmid, Krefeld; Helmut Winchenbach, Meerbusch, all of Fed. Rep. of Germany

[73] Assignee: Bayer Aktiengesellschaft, Fed. Rep. of Germany

[21] Appl. No.: 300,427

[22] Filed: Jan. 23, 1989

Related U.S. Application Data

[63] Continuation of Ser. No. 64,747, Jun. 22, 1987, abandoned.

[30] Foreign Application Priority Data

Jul. 4, 1986 [DE] Fed. Rep. of Germany ....... 3622540

[51] Int. Cl.$^4$ ............................................. B29C 35/08
[52] U.S. Cl. ............................................ 425/3; 264/1.4; 264/2.2; 425/174.2; 425/174.4; 425/174.8 R; 425/385; 425/443; 425/451.9; 425/808
[58] Field of Search ............... 425/174.8 R, 174.8 E, 425/3, 174.4, 808, 384–385, 150, 451.9, 400, 407, 443, 174.2; 264/1.3, 1.4, 106, 107, 2.2

[56] References Cited

U.S. PATENT DOCUMENTS

| | | | |
|---|---|---|---|
| 2,745,138 | 5/1956 | Beattie | 425/808 |
| 3,056,166 | 10/1962 | Weinberg | 425/808 |
| 3,474,494 | 10/1969 | Damm et al. | 425/384 |
| 3,752,620 | 8/1973 | Renoux | 425/385 |
| 4,166,088 | 8/1979 | Neefe | 425/808 |
| 4,637,904 | 1/1987 | Rounds | 264/1.4 |

FOREIGN PATENT DOCUMENTS

| | | | |
|---|---|---|---|
| 2840943 | 9/1979 | Fed. Rep. of Germany | 264/106 |
| 59-9024 | 1/1984 | Japan | 264/25 |
| 62-103116 | 5/1987 | Japan | 425/808 |

Primary Examiner—Jeffery Thurlow
Attorney, Agent, or Firm—Connolly and Hutz

[57] ABSTRACT

A pacified mass is hardened under controlled conditions to produce low tension moulded parts (4) of duroplasts, the shringkage being compensated for by the movement of a lower mould part (2) and/or an upper mould part (3) to follow the mass.

3 Claims, 2 Drawing Sheets

APPARATUS FOR THE PRODUCTION OF LOW TENSION MOULDED PARTS

BACKGROUND OF THE INVENTION

This application is a continuation of Ser. No. 07/064,747, filed 06/22/87, abandoned.

This invention relates to a process for the production of low tension moulded parts by which low viscosity reactive compositions which are capable of hardening and/or cross linking are converted into the solid state by polymerisation after their introduction into a mould.

The conversion of reaction resins to duroplasts by polymerisation and/or polyaddition is generally accompanied by a reduction in volume which has a disadvantageous effect on the quality of the moulded product. Internal strains occur in the moulded part, generally resulting in a loss of mechanical strength. The surface shows signs of collapse and in transparent materials, optical configurations are distorted by the formation of streaks. In very severe cases, cracks are found in the moulded part. The volumetric shrinkage causes relative displacements between the surface of the mould and the surface of the moulded part (detachment and/or transverse movements) so that the internal surface of the mould cannot be accurately reproduced on the moulded part.

It is known to introduce hardenable monomers and/or reaction resins into a mould, initiate the hardening reaction and compensate for the volumetric shrinkage during hardening by adding (under pressure) further quantities of hardenable monomers and/or oligomers. This procedure has the disadvantage that the additional monomers and/or oligomers introduced during the hardening process have to be forced along considerable distances from the inlet to the site of shrinkage, with the result that internal strains develop in the moulded part and the part becomes non-uniform. In transparent materials, in particular, this leads to the disadvantages already mentioned above. At a later phase of hardening, further introduction of monomers or oligomers under pressure is no longer possible owing to the increase in viscosity, and signs of collapse therefore appear in isolated areas of the moulded part.

It is also known (EP 0 142 367 A), to apply a plane parallel polymer layer to a substrate which is fixed in a mould and to introduce a liquid monomer into this mould and to detach the substrate from the mould during or before hardening of the substrate so that the substrate can move inside the mould and thus compensate for shrinkage during the process of polymerisation. The mould may be equipped, for example, with a detachable lid which is removed before or during shrinkage of the moulded part. The mould is thereby ventilated and the ambient pressure becomes operative in the region of the mould facing away from the coated side of the substrate before any significant shrinkage occurs. The substrate is therefore capable of moving and can compensate for the shrinkage.

A disadvantage of this procedure is that the production of a moulded part cannot always be carried out in a single stage but requires several stages for completion of the whole product. Moreover, the procedure presupposes a close bond between the substrate and the coating.

Lastly, a process is known by which moulded parts which have little or no internal tension are hardened at a very low reaction velocity at a low temperature and a low temperature difference. For the production of planar or plane parallel, flat surfaces, additional reactive product is introduced under a pressure in the region of 10 to 50 bar.

It is an object of the present invention to provide a process for the production of an irreversibly or reversibly hardened, low tension moulded part in which relative displacements between the moulded part and the surface of the mould during the process of hardening are avoided in spite of high reaction velocities and temperatures so that the given dimensions of the mould can be accurately reproduced in the moulded part and a product with excellent, homogeneous optical properties can be obtained.

To solve this problem by means of the invention, the composition to be moulded is brought in to a homogeneous, pacified state before it is hardened in predetermined directions and at least one of the internal surfaces of the closed mould in contact with the moulded part is moved in a direction to follow the moulded part as the latter changes its dimensions during hardening.

It has now surprisingly been found that moulded parts which are faithful reproductions of the mould, are free from streaks and relatively free from internal strains can be produced even under economically advantageous conditions, i.e. at high reaction velocities and temperatures, if changes (shrinkages) of the mass in the course of hardening are compensated by immediately moving the mould to follow the mass. Relative displacements between the mould and the moulded part are thereby avoided and shearing forces which could, for example, cause projecting parts to be torn off cannot be produced. At the same time, areas of collapse cannot occur since the mould is completely filled at every moment. Since hardening is orientated, it can be accurately controlled. The hardening front travels through the moulded part in hardening surfaces which are plane or successively assume certain three-dimensional shapes, so that internal strains do not arise.

Other embodiments are indicated in the subclaims.

The process is particularly suitable for thin, sheet like transparent moulded parts suc as discs or panes, lenses, etc. It has surprisIngly been found that if hardening takes place in the direction of the thickness of the moulded part then no significant shrinkages occur, in particular at right angles to this direction. Elevations and depressions on the internal surface of the mould are faithfully reproduced. Moreover, due to the layer-wise hardening, the disc or sheet is virtually free from internal strains and is therefore particularly suitable for the reproduction of information which is embodied in the contour of the structure and may subsequently be tapped, for example by laser beam.

The compositions used in the process have a viscosity below 10,000 mPas, in particular below 1,000 mPas, and may consist of various components with the possible inclusion of additives and may be degassified before use. They should be filled into the mould under conditions allowing for expansion and the flow velocity should be regulated in dependence upon the degree to which the mould is filled so that a laminar swelling stream exists at all times. It would be conceivable, however, to homogenize the velocity field by vibration after the mould has been filled and before it is closed; large distortions can thereby be eliminated. Moreover, the movement of the dipoles can to a large extent be damped by electromagnetic fields, in particular fields with reversible polarity.

By using a beam of rays, in particular with directed rays (UVA 340–420 nm) stepwise hardening can be carried out from outside and controlled as to direction and intensity, although the first step may take place inside the mould, for example in order to pacify the flow.

The wall of the mould through which the beam is directed should be to a large extent permeable to the waves within the operating range. Suitable materials for this purpose are, for example, quartz, silicates and for certain wave lengths also some amorphous synthetic resins. The depth of heating may be adjusted by adjusting the wave length or providing filters.

If two walls of the mould face each other, a temperature gradient may be established in one direction by providing channels in the walls for the introduction of heating or cooling medium.

Hardening may also be achieved by the addition of a peroxide from the inside to the outside or conversely, depending on the direction in which the heat is applied.

The low pressure employed compared with that of normal moulding processes is not only economically advantageous but ensures trouble free operation of the mould. The pressure should be adapted to the progress of the reaction of the composition.

The rate at which the wall of the mould is made to follow the contents depends on the shrinkage of the material used for moulding. To avoid undirected flow of composition or collapse, this movement of the wall should be adjusted to ensure that no gaps are present at any time.

The process according to the invention may be carried out with the apparatus claimed, which has the following characteristic features:

(1) part of the upper part of the mould is made of a transparent material capable of transmitting rays without significant absorption, at least in the operating range.

(2) the recess along the circular edge has an elastic seal, (3) the height of the clamping device is adjustable so that the upper part of the mould can follow the surface of the moulded part as required.

The following are examples of suitable reactive compounds or reactive components of mixtures:

Unsaturated polyester resins disolved in copolymerizable monomers, preferably styrene, vinyl toluenes, tert.-butyl styrenes, bis- and trifunctional acrylates, preferably methacrylates of linear and branched alkanols ($C_1$ to $C_{10}$), cyclohexanol, alkylcyclohexanols and phenols, cresols, bisphenols, preferably bisphenol A and F, and their reaction products with one to three, preferably one mol of ethylene oxide and/or propylene oxide per OH, glycerol and/or glycidyl ethers of the above mentioned phenols and bisphenols.

Aliphatic and/or cycloaliphatic and/or aromatic epoxide resins (EP) and isocyanates.

The following may be used as hardeners for EP systems: aliphatic, cycloaliphatic and aromatic amines and acid anhydrides, e.g. tetrahydrophthalic acid anhydride. The following are suitable hardeners for isocyanates: aliphatic and/or cycloaliphatic and/or aromatic polyols and/or amines and/or aminols.

The following are polymerization initiators for the purpose of this invention:

for radiation hardening, preferably with UV rays: e.g. benzophenone, 1-hydroxycyclohexyl-phenylketone, 2-methyl-1,4-(methylthio)-phenyl-2-morpholinopropanone-1, benzoin ethers, preferably benzoin isopropyl and isobutyl ether, benzildiketals, preferably benzildimethylketal, and optionally mixtures of the above mentioned compounds and/or preparations thereof, e.g. in plasticisers and/or the reactants used and/or in other reactants;

for radical hardening with organic peroxides or for mixed radiation/peroxide hardening: diacylperoxides, peroxydicarbonates, peresters, perketals, dialkylperoxides, ketone peroxides, hydroperoxides, e.g. bis-(2,4-dichloro-benzoyl)peroxide, dilauroylperoxide, dibenzoylperoxide, di-2-ethyl-hexylperoxydicarbonate, diisopropylperoxy-dicarbonate, dicyclohexyl-peroxydicarbonate, bis-(4-t-butyl-cyclohexyl)peroxydicarbonate, t-butyl-perpivalate, t-butyl-per-2-ethylhexanoate, t-butyl-per-3,5,5-trimethyl-hexanoate, t-butylperbenzoate, t-butyl-permaleate, 1,1-bis-(t-butylperoxy)-3,3,5-trimethyl-cyclohexane, 1,1-bis-(t-butylperoxy)-3,3,5-trimethyl-cyclohexane, 1,1-bis-(t-butylperoxy)cyclohexane, 2,2-bis-(t-butylperoxy)-butane, n-butyl-4,4-bis-(t-butylperoxy)-valerate, ethyl-3,3-bis-(t-butylperoxy)butyrate, dicumylperoxide, t-butylcumylperoxide, bis-(t-butylperoxy-isopropyl)-benzene, 2,5-dimethylhexane-2,5-di-t-butylperoxide, di-t-butylperoxide, methyl-isobutyl-ketone peroxide, methylethylketone peroxide, t-butyl-hydroperoxide and optionally mixtures of the above mentioned compounds and/or their preparations, e.g. 40–60% by weight in plasticisers based on phthalates, adipates, or phosphates.

Accelerators for the purpose of this invention may be inorganic or, preferably, organic salts soluble in the reaction masses, or complex compounds of metals, preferably of cobalt or vanadium, e.g. cobalt-octoate, -naphthenate, or -acetylacetonate, vanadyl-acetylacetonate, vanadyloctoate, vanadylacetate and vanadyl-p-toluene sulphonate. Amines may also be used, particularly tertiary alkylarylamines, e.g. N,N-dimethylaniline, N,N-dimethylaniline, 10% in styrene; N,N-diethylaniline, 10% in styrene; N,N-dimethyl-p-toluidine, 10% in styrene; N,N-bis-($\beta$-hydroxyethyl)-p-toluidine; N,N-bis-($\beta$-hydroxypropyl)-p-toluidine; N,N-bis-($\beta$-hydroxypropyl)-p-toluidineadipate.

Additional accelerators (promoters) used according to this invention for hardening with accelerators based on cobalt compounds include the above mentioned amines, preferably N,N-dimethylaniline, N,N-diethylaniline, N,N-dimethyl-p-toluidine, N,N-bis-$\beta$-hydroxy-ethyl and/or -propyl-p-toluidine and/or their esters, e.g. with adipic acid, phthalic acids or monocarboxylic acids ($C_2$–$C_{10}$).

The following are suitable additional accelerators for vanadium compounds: thiols and thio-carboxylic acid esters, in particular thioglycolic acid esters as described, for example, in German Auslegeschrift number 2 025 410.

The following are inibitors for the purpose of this invention: benzoquinone, toluquinone, naphthoquinones, trimethylquinone, mono- and di-tertiary butylquinone and/or hydroquinones, particularly hydroquinone itself, toluhydroquinone, 1,4-naphthohydroquinone and pyrocatechols, preferably tert.-butyl-pyrocatichol, and their esters with monocarboxylic acids and/or their monoalkyl ethers; also, chloranil and soluble copper salts and/or copper complexes, e.g. copper naphthenate, octoate and acetylacetonate, and the copper (I) chloride complex of tris-chloroethyl phosphite.

An example of the invention is illustrated in the drawings and described below. In the drawings,

BRIEF DESCRIPTION OF THE DRAWING

FIGS. 1 and 2 show a mould 1 comprising a lower part 2 and an upper part 3 between which the moulded part 4 is produced. A matrix or disc shape recess 5 with information depressions is placed on the top of the surface-ground lower part of the mould. This matrix is held at the circular edge by an elastic seal 6. The upper part 3 of the mould consists of transparent material such as a glass disc 7 which is held in place by a ring 9 having a rubber packing 10 at the lateral edge. This ring 9 is adjustable in height by springs 8 and its downward movement is determined by individual adaptor elements 11 and its upward movement by a clamping device 12 co-operating with an adjustment screw 13. The clamping device 12 consists of a column 14 supported on the lower part 2 of the mould and having an upper bracket 15 and an end piece 16. The height is adjusted in the upward direction by a cylindrical spring 17 and in the downward direction by a (hydraulically) movable lever 18.

Figure 1:
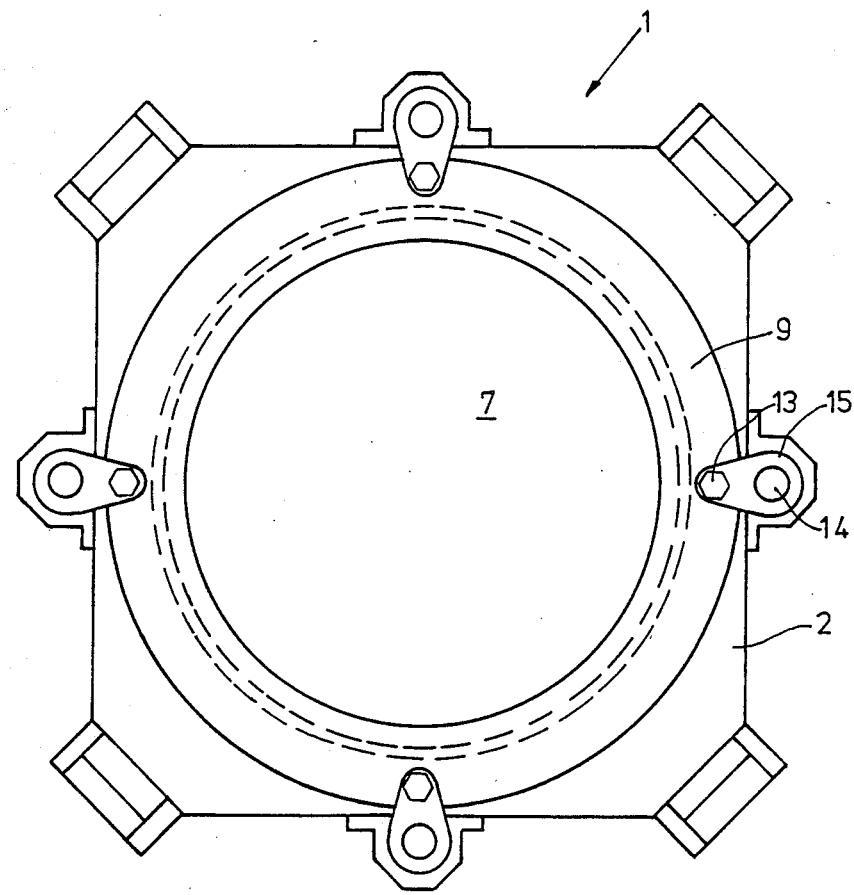
FIG. 1 is a top plan view of the mould.
Figure 2:
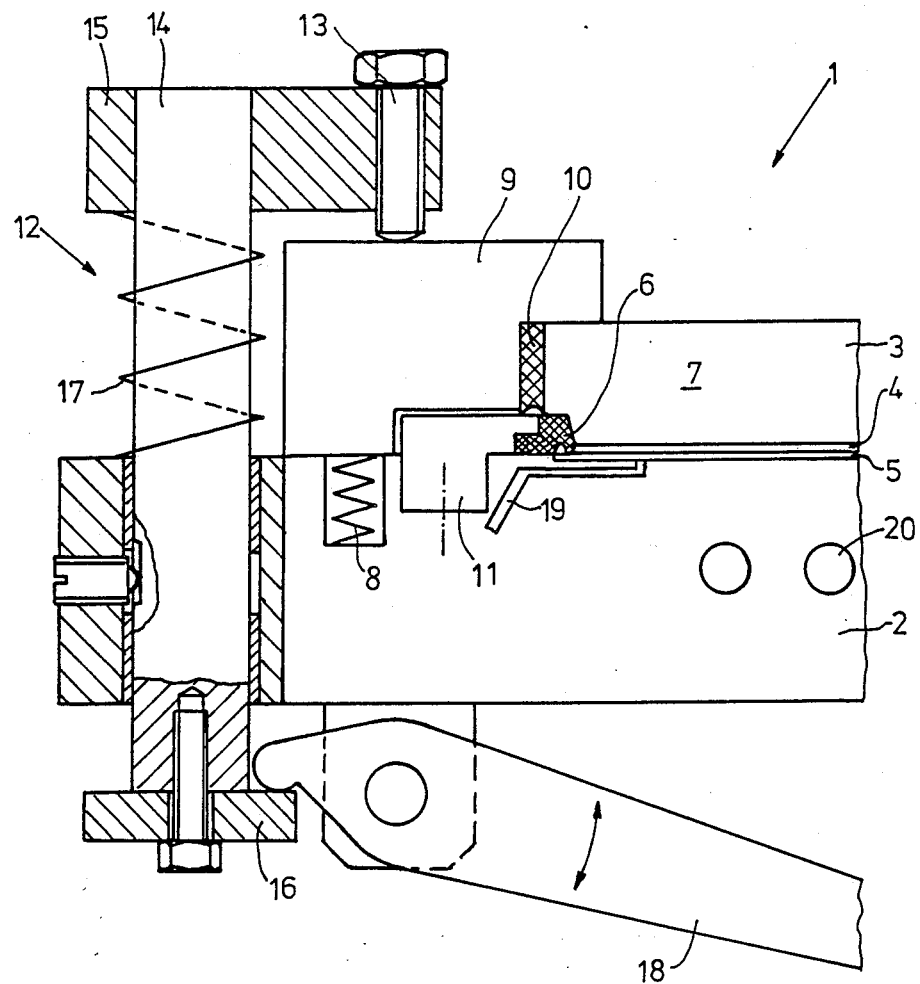
FIG. 2 is a section through the mould.

Vacuum channels 19 and channels 20 for heating medium are provided in the lower part 2 of the mould. This mould should be able to function, even if turned by 10 to 190 degrees.

Also, the mass to be molded may be pacified by the application of electric and/or magnetic fields.

We claim:

1. Apparatus for the production of low tension molded parts from masses with a viscosity of less than 1000 mPas capable of reactive hardening and/or cross-linking, the apparatus consisting of a lower mold part having a disc shaped recess therein for receiving a matrix to be molded, an upper mold part, a clamping device for moving the mold parts toward and away from one another, at least a portion of the upper mold part consisting of transparent material which transmits rays in a predetermined operating range without significant absorption, and an elastic seal fixed to one of the mold parts and positioned between the upper and lower mold parts at an outer peripheral portion of the recess in the lower mold part to prevent escape of the mass upon molding and allow both mold parts to follow the part being molded to its desired final thickness.

2. Apparatus as in claim 1 including vibration means connected to briefly vibrate the molds for adjusting the state of the mass to be molded.

3. Apparatus as in claim 1 including means applying one of electric and magnetic fields to the mass to be molded.

* * * * *